(12) United States Patent
Sikora et al.

(10) Patent No.: US 7,995,197 B2
(45) Date of Patent: Aug. 9, 2011

(54) DISTRIBUTED BACKSCATTERING

(75) Inventors: Edmund S R Sikora, Ipswich (GB); Peter Healey, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 705 days.

(21) Appl. No.: 11/663,954

(22) PCT Filed: Sep. 26, 2005

(86) PCT No.: PCT/GB2005/003680
§ 371 (c)(1),
(2), (4) Date: Mar. 28, 2007

(87) PCT Pub. No.: WO2006/035205
PCT Pub. Date: Apr. 6, 2006

(65) Prior Publication Data
US 2008/0278711 A1    Nov. 13, 2008

(30) Foreign Application Priority Data

Sep. 30, 2004 (GB) .................................. 0421747.7

(51) Int. Cl.
*G01N 21/00* (2006.01)
(52) U.S. Cl. ...................................................... 356/73.1
(58) Field of Classification Search .................. None
See application file for complete search history.

(56) References Cited

U.S. PATENT DOCUMENTS

| | | | |
|---|---|---|---|
| 4,297,887 A | 11/1981 | Bucaro | |
| 4,370,610 A | 1/1983 | Allen | |
| 4,397,551 A | 8/1983 | Bage et al. | |
| 4,443,700 A | 4/1984 | Macedo et al. | |
| 4,463,451 A | 7/1984 | Warmack et al. | |
| 4,538,103 A | 8/1985 | Cappon | |
| 4,572,949 A | 2/1986 | Bowers et al. | |
| 4,593,385 A | 6/1986 | Chamuel | |
| 4,649,529 A | 3/1987 | Avicola | |
| 4,654,520 A | 3/1987 | Griffiths | |
| 4,668,191 A | 5/1987 | Plischka | |
| 4,688,200 A | 8/1987 | Poorman et al. | |

(Continued)

FOREIGN PATENT DOCUMENTS

EP    0 251 632 A2    1/1988

(Continued)

OTHER PUBLICATIONS

International Search Report for PCT/GB2005/003680 mailed Dec. 1, 2005.

(Continued)

*Primary Examiner* — Tu T Nguyen
(74) *Attorney, Agent, or Firm* — Patterson Thuente Christensen Pedersen, P.A.

(57) ABSTRACT

The present invention relates to a method for detecting or inferring a physical disturbances on a communications link, in particular by using distributed backscattering. The method includes the steps of: transmitting test signals onto a link; receiving test signals returned from a remote portion of the link; performing a function on the returned test signals; and in dependence on at least one characteristic of the combination signal, inferring the presence of a disturbance. The test signal are returned by a process Rayleigh backscattering along the fibre, so existing fibre installations can be used without requiring a mirror to be specifically introduced.

29 Claims, 2 Drawing Sheets

U.S. PATENT DOCUMENTS

| | | | |
|---|---|---|---|
| 4,697,926 A | 10/1987 | Youngquist et al. | |
| 4,708,471 A | 11/1987 | Beckmann et al. | |
| 4,708,480 A | 11/1987 | Sasayama et al. | |
| 4,770,535 A | 9/1988 | Kim et al. | |
| 4,781,056 A | 11/1988 | Noel et al. | |
| 4,805,160 A | 2/1989 | Ishii et al. | |
| 4,847,596 A | 7/1989 | Jacobson et al. | |
| 4,885,462 A | 12/1989 | Dakin | |
| 4,885,915 A | 12/1989 | Jakobsson | |
| 4,897,543 A | 1/1990 | Kersey | |
| 4,907,856 A | 3/1990 | Hickernell | |
| 4,976,507 A | 12/1990 | Udd | |
| 4,991,923 A | 2/1991 | Kino et al. | |
| 4,994,668 A | 2/1991 | Lagakos et al. | |
| 4,994,886 A | 2/1991 | Nadd | |
| 5,004,912 A | 4/1991 | Martens et al. | |
| 5,015,842 A | 5/1991 | Fradenburgh et al. | |
| 5,025,423 A | 6/1991 | Earp | |
| 5,046,848 A | 9/1991 | Udd | |
| 5,051,965 A | 9/1991 | Poorman | |
| 5,093,568 A | 3/1992 | Maycock | |
| 5,104,391 A | 4/1992 | Ingle et al. | |
| 5,140,559 A | 8/1992 | Fisher | |
| 5,173,743 A | 12/1992 | Kim | |
| 5,187,362 A | 2/1993 | Keeble | |
| 5,191,614 A | 3/1993 | LeCong | |
| 5,194,847 A | 3/1993 | Taylor et al. | |
| 5,206,924 A | 4/1993 | Kersey | |
| 5,223,967 A | 6/1993 | Udd | |
| 5,307,410 A | 4/1994 | Bennett | |
| 5,311,592 A | 5/1994 | Udd | |
| 5,313,266 A | 5/1994 | Keolian et al. | |
| 5,319,609 A | 6/1994 | Regnault | |
| 5,351,318 A | 9/1994 | Howell et al. | |
| 5,355,208 A | 10/1994 | Crawford et al. | |
| 5,359,412 A | 10/1994 | Schulz | |
| 5,361,130 A | 11/1994 | Kersey et al. | |
| 5,363,463 A | 11/1994 | Kleinerman | |
| 5,373,487 A | 12/1994 | Crawford et al. | |
| 5,379,357 A | 1/1995 | Sentsui et al. | |
| 5,384,635 A * | 1/1995 | Cohen et al. | 356/73.1 |
| 5,412,464 A | 5/1995 | Thomas et al. | |
| 5,457,998 A | 10/1995 | Fujisaki et al. | |
| 5,473,459 A | 12/1995 | Davis | |
| 5,491,573 A | 2/1996 | Shipley | |
| 5,497,233 A | 3/1996 | Meyer | |
| 5,500,733 A | 3/1996 | Boisrobert et al. | |
| 5,502,782 A | 3/1996 | Smith | |
| 5,511,086 A | 4/1996 | Su | |
| 5,592,282 A * | 1/1997 | Hartog | 356/44 |
| 5,604,318 A | 2/1997 | Fasshauer | |
| 5,636,021 A | 6/1997 | Udd | |
| 5,637,865 A | 6/1997 | Bullat et al. | |
| 5,663,927 A | 9/1997 | Olson et al. | |
| 5,691,957 A | 11/1997 | Spiesberger | |
| 5,694,114 A | 12/1997 | Udd | |
| 5,754,293 A | 5/1998 | Farhadiroushan | |
| 5,767,950 A | 6/1998 | Hawver et al. | |
| 5,778,114 A | 7/1998 | Eslambolchi et al. | |
| 5,936,719 A | 8/1999 | Johnson et al. | |
| 5,975,697 A | 11/1999 | Podoleanu | |
| 5,982,791 A | 11/1999 | Sorin | |
| 5,991,479 A | 11/1999 | Kleinerman | |
| 6,072,921 A | 6/2000 | Frederick et al. | |
| 6,075,628 A | 6/2000 | Fisher et al. | |
| 6,115,520 A | 9/2000 | Laskowski et al. | |
| 6,148,123 A | 11/2000 | Eslambolchi | |
| 6,185,020 B1 | 2/2001 | Horiuchi et al. | |
| 6,194,706 B1 | 2/2001 | Ressl | |
| 6,195,162 B1 | 2/2001 | Varnham et al. | |
| 6,269,198 B1 | 7/2001 | Hodgson et al. | |
| 6,269,204 B1 | 7/2001 | Ishikawa | |
| 6,285,806 B1 | 9/2001 | Kersey et al. | |
| 6,315,463 B1 | 11/2001 | Kropp | |
| 6,381,011 B1 * | 4/2002 | Nickelsberg et al. | 356/73.1 |
| 6,459,486 B1 | 10/2002 | Udd et al. | |
| 6,487,346 B2 | 11/2002 | Nothofer | |
| 6,489,606 B1 | 12/2002 | Kersey et al. | |
| 6,594,055 B2 | 7/2003 | Snawerdt | |
| 6,625,083 B2 | 9/2003 | Vandenbroucke | |
| 6,628,570 B2 | 9/2003 | Ruffa | |
| 6,704,420 B1 | 3/2004 | Goedgebuer et al. | |
| 6,788,417 B1 | 9/2004 | Zumberge et al. | |
| 6,813,403 B2 | 11/2004 | Tennyson | |
| 6,859,419 B1 | 2/2005 | Blackmon et al. | |
| 6,943,872 B2 | 9/2005 | Endo et al. | |
| 7,006,230 B2 | 2/2006 | Dorrer et al. | |
| 7,110,677 B2 | 9/2006 | Reingand | |
| 7,266,299 B1 | 9/2007 | Bock et al. | |
| 7,397,568 B2 | 7/2008 | Bryce | |
| 7,536,102 B1 | 5/2009 | Huffman et al. | |
| 7,548,319 B2 * | 6/2009 | Hartog | 356/478 |
| 7,656,535 B2 | 2/2010 | Healey et al. | |
| 7,667,849 B2 | 2/2010 | Sikora | |
| 7,697,795 B2 | 4/2010 | Heatley et al. | |
| 7,725,026 B2 | 5/2010 | Patel et al. | |
| 7,755,971 B2 | 7/2010 | Heatley et al. | |
| 7,796,896 B2 | 9/2010 | Sikora et al. | |
| 7,817,279 B2 | 10/2010 | Healey | |
| 7,848,645 B2 | 12/2010 | Healey et al. | |
| 2001/0028766 A1 | 10/2001 | Hatami-Hanza | |
| 2002/0196447 A1 | 12/2002 | Nakamura et al. | |
| 2003/0103211 A1 | 6/2003 | Lange et al. | |
| 2003/0117893 A1 | 6/2003 | Bary | |
| 2003/0174924 A1 | 9/2003 | Tennyson | |
| 2004/0027560 A1 | 2/2004 | Fredin et al. | |
| 2004/0113056 A1 | 6/2004 | Everall et al. | |
| 2004/0201476 A1 | 10/2004 | Howard | |
| 2004/0208523 A1 | 10/2004 | Carrick et al. | |
| 2004/0227949 A1 | 11/2004 | Dorrer et al. | |
| 2006/0163457 A1 | 7/2006 | Katsifolis et al. | |
| 2006/0256344 A1 | 11/2006 | Skora et al. | |
| 2007/0009600 A1 | 1/2007 | Edgren et al. | |
| 2007/0065150 A1 | 3/2007 | Sikora et al. | |
| 2007/0127933 A1 | 6/2007 | Hoshida et al. | |
| 2007/0264012 A1 | 11/2007 | Healey et al. | |
| 2008/0013161 A1 | 1/2008 | Tokura et al. | |
| 2008/0018908 A1 | 1/2008 | Healey et al. | |
| 2008/0123085 A1 | 5/2008 | Sikora et al. | |
| 2008/0166120 A1 | 7/2008 | Heatley et al. | |
| 2008/0219093 A1 | 9/2008 | Heatley et al. | |
| 2008/0219660 A1 | 9/2008 | Healey et al. | |
| 2008/0232242 A1 | 9/2008 | Healey et al. | |
| 2009/0014634 A1 | 1/2009 | Sikora et al. | |
| 2009/0097844 A1 | 4/2009 | Healey | |
| 2009/0103928 A1 | 4/2009 | Healey et al. | |
| 2009/0135428 A1 | 5/2009 | Healey | |
| 2009/0252491 A1 | 10/2009 | Healey | |
| 2009/0274456 A1 | 11/2009 | Healey et al. | |

FOREIGN PATENT DOCUMENTS

| | | |
|---|---|---|
| EP | 0 360 449 A2 | 3/1990 |
| EP | 0 364 093 | 4/1990 |
| EP | 0 376 449 A1 | 7/1990 |
| EP | 0 377 549 | 7/1990 |
| EP | 0 513 381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1 236 985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 4115205 | 4/1992 |
| JP | 2001-194109 | 7/2001 |

| WO | WO 93/25866 A1 | 12/1993 |
| WO | WO 97/05713 A1 | 2/1997 |
| WO | WO 01/67806 A1 | 9/2001 |
| WO | WO 02/065425 A1 | 8/2002 |
| WO | WO 03/014674 A2 | 2/2003 |
| WO | WO 2005/008443 A2 | 1/2005 |
| WO | WO 2005/008443 A2 | 1/2005 |
| WO | WO2005/095917 | 10/2005 |

OTHER PUBLICATIONS

International Search Report mailed Jan. 14, 2005 in International Application No. PCT/GB2004/004169.
UK Search Report dated Dec. 4, 2003 in GB Application No. GB 0322859.0.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
International Search Report dated Nov. 22, 2005.
U.S. Appl. No. 10/573,266, filed Mar. 23, 2006, Sikora et al.
U.S. Appl. No. 11/403,200, filed Apr. 13, 2006, Sikora et al.
U.S. Appl. No. 11/791,927, filed May 31, 2007, Sikora et al.
U.S. Appl. No. 11/791,923, filed May 31, 2007; Healey et al.
U.S. Appl. No. 11/663,957, filed Mar. 28, 2007, Healey et al.
U.S. Appl. No. 11/885,275, filed Aug. 29, 2007, Heatley et al.
U.S. Appl. No. 11/885,400, filed Aug. 27, 2007, Heatley et al.
U.S. Appl. No. 11/916,054, filed Nov. 30, 2007, Sikora et al.
U.S. Appl. No. 11/887,382, filed Sep. 28, 2007, Healey et al.
U.S. Appl. No. 11/918,434, filed Oct. 12, 2007, Healey et al.
U.S. Appl. No. 12/295,784, filed Oct. 2, 2008, Healey et al.
U.S. Appl. No. 12/280,051, filed Aug. 20, 2008, Healey.
U.S. Appl. No. 12/280,047, filed Aug. 20, 2008, Healey.
U.S. Appl. No. 12/280,038, filed Aug. 20, 2008, Healey.
Office Action dated Sep. 19, 2008 in U.S. Appl. No. 10/573,266.
Office Action dated Mar. 17, 2009 in U.S. Appl. No. 10/573,266.
Office Action dated Jan. 23, 2009 in U.S. Appl. No. 11/403,200.
Office Action dated Jun. 6, 2008 in U.S. Appl. No. 11/403,200.
Office Action dated Aug. 23, 2007 in U.S. Appl. No. 11/403,200.
Office Action dated Mar. 25, 2009 in U.S. Appl. No. 11/885,275.
Office Action dated Jul. 7, 2009 in U.S. Appl. No. 11/885,400.
Office Action Jan. 14, 2009 in U.S. Appl. No. 11/885,400.
Office Action dated May 14, 2009 in U.S. Appl. No. 11/916,054.
Office Action dated Sep. 5, 2008 in U.S. Appl. No. 11/791,923.
Office Action dated Feb. 26, 2009 in U.S. Appl. No. 11/791,923.
International Search Report dated Dec. 16, 2005 in PCT/GB2005/003594.
International Search Report mailed May 8, 2006 in PCT/GB2006/00750.
International Search Report mailed May 29, 2006 in PCT/GB2006/000759.
International Search Report mailed Jun. 30, 2006, dated Jun. 7, 2006, in PCT/GB2006/001173.
International Search Report mailed Jul. 17, 2007 in PCT/GB2007/001188.
International Search Report mailed Jul. 27, 2006 in PCT/GB2006/001993.
International Search Report mailed Apr. 13, 2007 in PCT/GB2007/000360.
International Search Report mailed Apr. 18, 2007 in PCT/GB2007/000343.
International Search Report mailed May 24, 2006 in PCT/GB2006/001325.
International Search Report mailed May 2, 2007 in PCT/GB2007/000359.
International Search Report dated Mar. 15, 2006, mailed Mar. 24, 2006 in PCT/GB2005/004873.
UK Search Report dated May 24, 2005 in GB506591.7.
International Search Report dated May 16, 2006 in PCT/GB2005/004850.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates In Coherent OTDR," Electronics Letters, vol. 20, No. 11, May 24, 1984.
Application and File History of U.S. Appl. No. 11/918,434, Inventor: Healey, filed Oct. 12, 2007, as available on PAIR at www.uspto.gov.
Application and File History of U.S. Appl. No. 11/887,382, Inventor: Healey, filed Sep. 28, 2007, as available on PAIR at www.uspto.gov.
Application and File History of U.S. Appl. No. 12/280,038, Inventor: Healey, filed, Aug. 20, 2008, as available on PAIR at www.uspto.gov.
Application and File History of U.S. Appl. No. 11/791,927, Inventor: Sikora, filed May 31, 2007, as available on PAIR at www.uspto.gov.
Application and File History of U.S. Appl. No. 12/295,784, Inventor: Healey, filed, Oct. 2, 2008, as available on PAIR at www.uspto.gov.
Application and File History of U.S. Appl. No. 10/594,433, Inventor: Healey, filed, Sep. 26, 2006, as available on PAIR at www.uspto.gov.
Application and File History of U.S. Appl. No. 12/280,047, Inventor: Healey, filed, Aug. 20, 2008, as available on PAIR at www.uspto.gov.
Application and File History of U.S. Appl. No. 12/280,051, Inventor: Healey, filed, Aug. 20, 2008, as available on PAIR at www.uspto.gov.
Application and File History of U.S. Appl. No. 11/663,957, Inventor: Healey, filed, Mar. 28, 2007, as available on PAIR at www.uspto.gov.
Application and File History of U.S. Appl. No. 11/403,200, Inventor: Sikora, filed, Apr. 13, 2006, as available on PAIR at www.uspto.gov.
Application and File History of U.S. Appl. No. 10/573,266, Inventor: Sikora, filed, Mar. 23, 2006, as available on PAIR at www.uspto.gov.
Application and File History of U.S. Appl. No. 11/791,923, Inventor: Healey, filed, May 31, 2007, as available on PAIR at www.uspto.gov.
Application and File History of U.S. Appl. No. 11/885,275, Inventor: Heatley, filed, Aug. 29, 2007, as available on PAIR at www.uspto.gov.
Application and File History of U.S. Appl. No. 11/885,400, Inventor: Heatley, filed, Aug. 30, 2007, as available on PAIR at www.uspto.gov.
Application and File History of U.S. Appl. No. 11/916,054, Inventor: Sikora, filed, Nov. 30, 2007, as available on PAIR at www.uspto.gov.
European Search Report, Application No. 05733029.2-1524, dated Apr. 6, 2010, 7 pages.
State Intellectual Property Office of China, Text of First Office Action, Dated Aug. 15, 2008.
State Intellectual Property Office of China, Second Notification of Office Action, Application No. 200580009905.4, dated Mar. 27, 2009, 4 pages.
State Intellectual Property Office of China, Third Notification of Office Action, Application No. 200580009905.4, dated Jun. 19, 2009, 4 pages.
State Intellectual Property Office of China, Rejection Decision, Application No. 200580009905.4, Dated Dec. 4, 2009, 19 pages.
European Search Report, Application No. 05826466.4-2415, dated Jul. 27, 2010.
Application and File History of U.S. Appl. No. 11/885,275, Inventor: Healey, filed, Aug. 29, 2007.
Japanese Office Action for Japanese Application No. 2007-505635 mailed Aug. 17, 2010.
Office Action from U.S. Appl. No. 12/295,784 mailed May 12, 2011.
Notice of Allowance from U.S. Appl. No. 12/280,047 mailed May 26, 2011.

* cited by examiner

DISTRIBUTED BACKSCATTERING

This application is the US national phase of international application PCT/GB2005/003680 filed 26 Sep. 2005 which designated the U.S. and claims benefit of GB 0421747.7, dated 30 Sep. 2004, the entire content of each of which is hereby incorporated by reference.

BACKGROUND

1. Technical Field

The present invention relates to detecting or inferring physical disturbances on a communications link, in particular by using distributed backscattering.

2. Related Art

It is known to detect disturbances in a data communications link by causing signals from one data link to interfere with signals which have traveled along another data link. However, this normally requires the signals to travel coherently along the data link, which requirement is not always possible to achieve.

BRIEF SUMMARY

According to one aspect of the present invention, there is provided a method of monitoring an optical transmission link to detect a physical disturbance of the link, the method including the steps of: transmitting pairs of signal copies onto an optical transmission link; receiving returned signal copies previously transmitted onto the link; for returned signal copies, combining one signal copy of a pair with the other signal copy of that pair, such that, from the combination of the two signal copies of a pair, a combination signal is generated; and, from the combination signal, generating a disturbance alert signal, wherein the signal copies are returned by a process of distributed backscattering along the optical transmission link.

The disturbance alert signal may be an audio signal representative of the physical disturbance occurring, for example if the disturbance alert signal is an amplified and/or filtered form of the combination signal. Alternatively or in addition, the disturbance alert signal may be generated in dependence on at least one characteristic of the combination signal, for example a threshold level.

The distributed backscattering may be caused by a plurality of backscattering centres or groups of backscattering centres, such as partially reflecting interfaces, imperfections, inclusions of foreign matter (such as air bubbles), spatial fluctuations in density or composition, or other inhomogeneities distributed along the transmission link. Preferably, the transmission medium of the transmission link will have inhomogeneities whose dimensions are preferably much smaller than the wavelength of light propagating along the medium, such that Rayleigh scattering occurs. However, inhomogeneities that are of comparable dimensions or larger than the wavelength may give rise to backscattering.

Other mechanisms also cause backscattering, such as irregularities on the fibre core-cladding interface, inclusions (such as air bubbles).

In a preferred embodiment, the transmission link will be an optical fibre, for example an optical fibre with a transmission medium formed from plastics material or glass, preferably silica glass. The distributed backscattering will preferably be Rayleigh scattering, caused by inhomogeneities in the transmission medium of the fibre, which inhomogeneities will normally be in the core of the fibre. However, inhomogeneities in the cladding and irregularities on the fibre core-cladding interface may also contribute to backscattering.

Because backscattering, such as Rayleigh backscattering, is used to provide return signals, a mirror is not needed at the fibre end. The fibre end will preferably be an unprepared fibre end (prepared fibre ends include for example cleaved and formed with a cleaving machine to form a right angled end facet, an end immersed in mercury, or an end on which a mirror is formed, such as a mirror grown from silver nitride). An unprepared fibre end may be simply formed by snapping or otherwise breaking the fibre, such as by bending the fibre over a sharp angle, or by the fibre by applying tension thereto in an abrupt fashion.

Typically, the minimum length of fibre required to achieve a sufficient amount of backscattering (that is, so as to form a sufficient strong return signal) has been found to be about 50 or 100 m, although the length may be about 1 km or more. The surprising discovery that distributed backscattering is sufficient in itself to provide return signals means that existing fibre installation can be employed, without requiring a reflector to be introduced specifically for the disturbance sensor. This is likely to be particularly important where fibres are located at a position that is difficult to reach, or where placing a reflecting element in the fibre would unduly affect data traffic along the fibre. Alternatively, the fibre may have a free end that can be introduced in or around an area or component that is to be sensed. Another situation where the appreciation that backscattering may be relied upon can be put to a useful advantage is when the far end of the fibre is terminated by an index matching material or a reflection-reducing termination.

Because for each signal generated by the source, that signal is copied before (possibly modified) copies are combined, any relative change in the signal copies is likely to be due to a disturbance, in particularly a dynamic or time-varying disturbance. For example, a dynamic disturbance may be caused by an acoustic or other vibration.

A characteristic of the combination signal indicative of a disturbance may be a change in the spectrum of the combination signal, or a change in the amplitude of one or more frequency components of the combination signal. Alternatively, such a characteristic may be a change in amplitude of the combination signal.

The output signals will preferably be optical signals from an optical source, in which case the communications link will preferably be an optical fibre (although a different type of waveguide could be used). A physical disturbance of the fibre is likely to lead to a strain in the fibre, which strain is likely to affect the optical properties of the transmission medium of the fibre. Such changes in the optical properties of the fibre can then conveniently be detected when the respective signals of a pair are combined. The steps of copying output signals and transmitting the signals will preferably be carried out at a first location, the signals being returned in a distributed fashion along the transmission link.

The output signals from a source will preferably have an irregular component, the step of copying the output signals resulting in that for each output signal, there is a pair of signal copies, the irregular component being common to each of the signal copies of a pair (the signal copies need not be exact copies, and other aspects of the copies such as the amplitude need not be the same). The irregular component will preferably be random, or pseudo random (by pseudo random, it is meant that although in theory a component is possible to predict, the time or processing power required to do this will make it in practice impossible to predict). If the output signal has a waveform, the irregular component may be provided by the phase of the waveform, provided that the waveform has randomly occurring phase changes. A source for a waveform can conveniently be provided by an optical source having a short coherence time, preferably less than 10 pico seconds or even less than 1 pico second. If the signals have a waveform, the combination will preferably be the interference or mixing of two waveforms, the signals being portions of the waveform, which portions will preferably be joined seamlessly to form a continuous waveform.

Preferably, the copies of a pair of signals will be delayed relative to one another at the first location, such that a leading copy and a trailing copy are transmitted from the first location, the leading copy arriving at the second location before the trailing copy. The signal copy can then be returned to the first location, where the leading copy will preferably be delayed relative to the previously trailing copy, such that both copies can be combined substantially in step with one another. In a preferred embodiment, the output from the optical source is fed to an interferometer stage, such as an unbalanced Mach Zehnder interferometer, where the signal is copied, one copy being channelled to one path of the interferometer, whilst the other copy is channelled to another path of the interferometer, the transit time associated with each path being different, such that a relative or differential delay results between the time at which the signal copies are transmitted from the interferometer stage. The same interferometer stage can then be employed to re-align to returned signal copies of a pair in a particularly convenient manner, since the relative delay imposed in the outbound direction will be the same as the relative delay imposed in the return direction, this being in each case determined by the difference in the transit times of the two paths.

The differential delay will preferably be chosen in dependence on the average coherence time of the source. The differential delay will preferably be much longer than the coherence time, so that the average amplitude of the combination signal is less sensitive to the precise magnitude of the differential delay. Preferably, the ratio of the differential delay to the coherence time will be greater or equal to $10^3$, yet more preferably $10_5$ or even yet more preferably $10^7$ or $10^9$.

The signal will preferably be output from the source as a continuous stream in the manner of a carrier signal, the carrier signal being composed of a succession of wavetrains each having a respective coherence length or time. However, the output from the source may be pulsed or operate in burst mode.

BRIEF DESCRIPTION OF THE DRAWINGS

Further aspects of the invention are provided in the appended claims. The present invention will now be described in further details below, by way of example, with reference to the following drawing in which:

FIG. 1 shows the basic system architecture of a surveillance system. In general terms, it comprises at a near end of an optical fibre (here a silica glass fibre), an optical source, an unbalanced Mach-Zehender interferometer (with a fibre delay and polarisation scrambler "POL" in one arm), an analogue optical receiver, a filter and a signal processing system. A disturbance is shown at position "d".

DETAILED DESCRIPTION OF EXEMPLARY EMBODIMENTS

Figure 1:
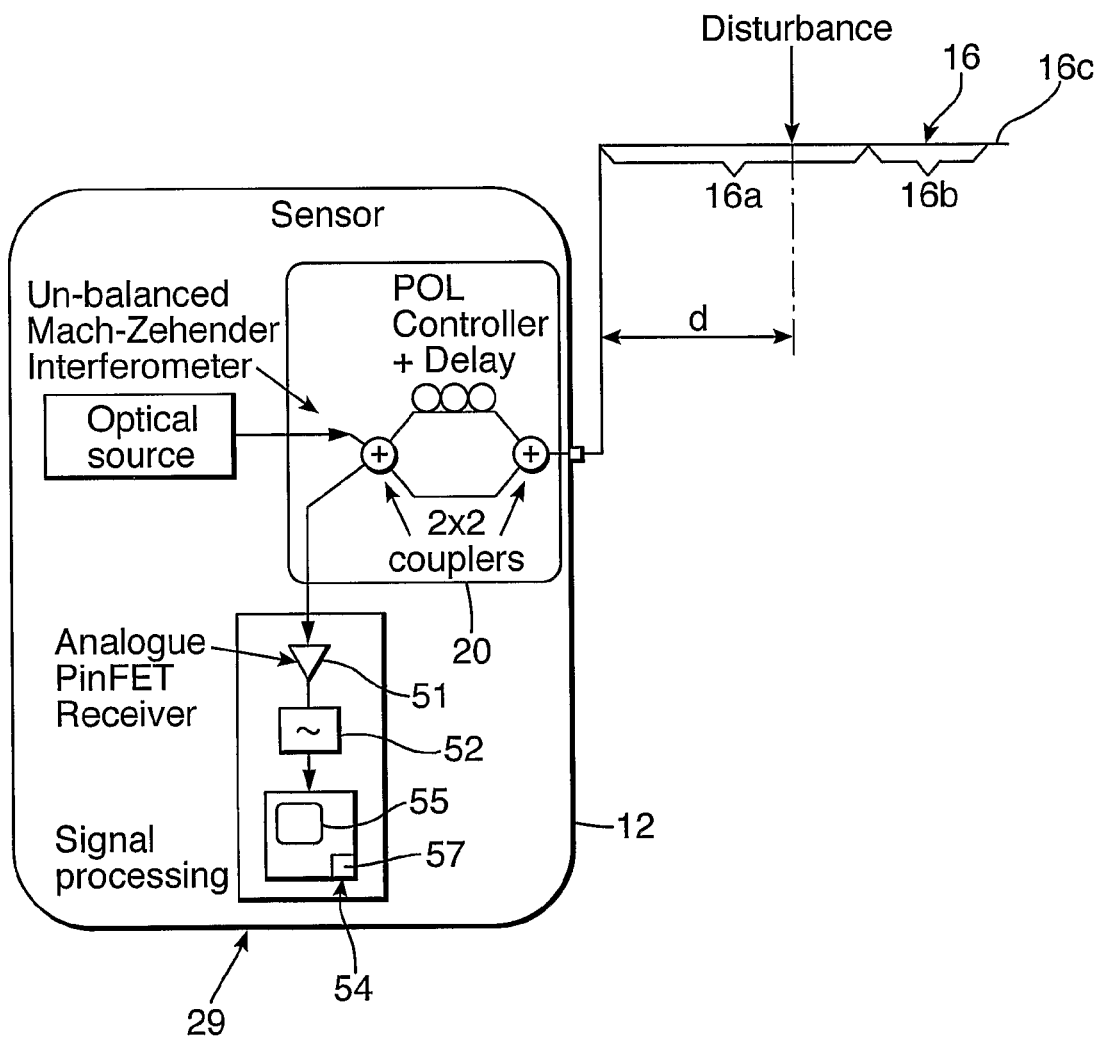
FIG. 1 shows a surveillance system according to the present invention.

Light from the optical source is split into two paths in the Mach-Zehender interferometer; one path is connected directly and one goes via an optical delay of several kilometres of standard fibre and polarisation scrambler. Thus the fibre under test conveys two copies of the source signal, one delayed by an amount "D" relative to the other. The source signals are backscattered in a continuous fashion as they propagate from the source along the fibre, the backscattered signals being returned towards the source after they have traveled through a portion of the fibre. For signals that had propagated beyond the disturbance point, the phase, polarisation and amplitude of the signals will be perturbed by the disturbance in both the forward and reverse directions of propagation. On returning to the interferometer the differential delay "D" is effectively un-done for one pair of propagating signals. Optical interference takes place at the 2×2 port coupler nearest the receiver creating an intensity modulated output signal that is sensitive to micro disturbances along the fibre under test (different types of disturbance will give rise to different characteristic signatures that can be identified by their respective spectral content).

The fibre 16 can be viewed as having a sensing portion 16a along which a disturbance can be sensed, and a return portion 16b along which test signals used for sensing the disturbance are backscattered towards their origin (that is, towards the near end of the optical fibre). It will be appreciated that the test signals are backscattered in part as they travel along the sensing portion, signals backscattered on the far side of a disturbance contributing to return signals used for sensing the disturbance, whilst signals backscattered on the near side will not contribute. Thus the sensing portion provides an allocated region of fibre along the extent of which it will be possible to sense a disturbance, the return portion being a minimum length (for example as measured from the end of the fibre) reserved or allocated for backscattering test signals sufficiently strongly, this minimum length being dependent on the system sensitivity and type or magnitude of the expected disturbance to be sensed. In the (backscattering) return portion, the expected disturbance type/magnitude will not normally be able to be sensed because the strength of the return signals will be too low. The length of the at least to return portion (and possibly the sensing portion) may be allocated, for a given system sensitivity, in dependence on the type/magnitude of the disturbance that is to be sense. In the case of an acoustic disturbance, for example, a disturbance having a minimum power-related characteristic may be stipulated, and the length of the return portion may be chosen in dependence on this minimum level.

It will be appreciated that the far end (in this example 16c) of the return portion of the fibre may but need not always coincide with the actual end of the fibre. For example, if the fibre is very long, such as several hundreds km in length, as is possible for transmission fibres, the cumulative affect of attenuation along the fibre will prevent the furthest points from contributing significantly to backscattered return signal used for sensing.

The respective lengths of the sensing and return portions will depend on the fibre characteristics, the power of the source (typically 1-100 mmW), the sensitivity of the detector/receiver, and the wavelength of the test signals. Shorter wavelength, for example around 850 nm (+/−10%) will suffer more attenuation, but will suffer more backscatter than signals having a longer wavelength such as around 1550 nm, or 1480 nm, or around 1310 nm (each +/−10%). Typically, for a wavelength of around 1480 nm, travelling in single mode fibre, the expected length of fibre needed to backscatter signals sufficiently strongly to allow detection of a disturbance (that is, the length of the return portion 16b) will be about 50 m, or at a wavelength of 850 nm, about 10 m.

Towards the far end of the sensing portion 16a bordering the return portion 16b, the sensitivity of the system to a given type of disturbance will decrease progressively, up to the point at the end of the sensing region, beyond which the backscattering is too weak to allow a given type of disturbance to be detected.

In the embodiment of FIG. 1, the fibre end 16c is a free end: the free end could be achieved by simply breaking the fibre, such that it is unprepared (although the free end may reflect some light, typically around 4%, this would not be sufficient without backscattering to allow detection of a disturbance). A fibre with a free end is particularly convenient since the fibre can be permanently or temporarily introduced in/around a region or object to be sensed. For example, the fibre could be introduced into an underground duct, at one end of the duct, without the free end necessarily being recovered at the other end of the duct. Clearly, if a free end only provides 4% reflection or less than 5% or 6%, the distributed backscattering will be responsible for the vast majority of the returned signal—typically at least 90%.

The fibre may be ordinary commercially available fibre, such as single mode silica glass fibre. In such fibre, Rayleigh scattering is normally caused by inhomogeneities in the dielectric medium of the glass whose correlation length is small compared with the wavelength of the light. The inhomogeneities normally arise from the thermal and compositional fluctuations in the glass structure which are 'frozen-in' when the glass first solidified. Thus, the backscattering may be due to density or compositional perturbations or variations in the glass which arise during a cooling phase of the manufacturing process. In this way, the imperfections or inhomogeneities (which are often considered undesirable) will normally be introduced unintentionally when the fibre in manufactured. However, further imperfections may be introduced into the fibre, preferably in a backscattering portion thereof, so as to yet further increase backscattering.

We have performed an initial theoretical analysis of the operation of this instrument that explains the nature of the experimental results observed. The analysis shows that the predominant cause of the observed signal is due to phase modulation of the test signal (i.e., the output signal copies). We have also confirmed operation with different types of optical source, ranging from a highly un-coherent source of un-polarised amplified spontaneous emission (ASE) generated by a Erbium doped fibre amplifier (EDFA) (coherence length ~0.1 mm) to a typical systems distributed feedback (DFB) laser (coherence length ~20 m). We have also used a multi-longitudinal mode Fabry-Perot laser.

Figure 2:
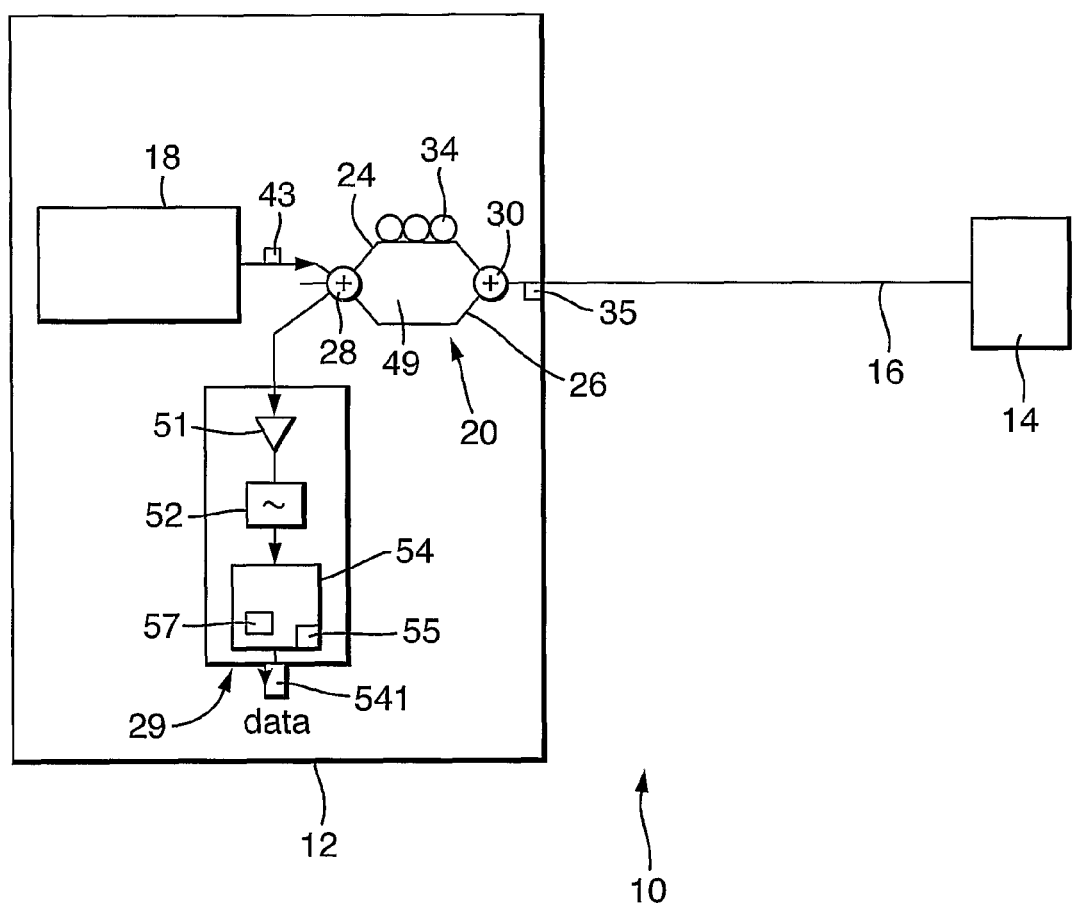
FIG. 2 shows another embodiment of a surveillance system.

To explain in more detail the operational principles of the system of FIG. 1, another embodiment shown in FIG. 2 will now be described in detail. FIG. 2 shows a fibre monitoring system (also suitable for surveillance) in which a monitoring station 12 can monitor an optical communication link 16 extending from the monitoring station 12, in this example to an outstation 14. The monitoring station 12 includes an optical source 18 with a short coherence time (random phase changes in the output providing an irregular component to the signal). A carrier signal having the form of wave train portions (hereinafter referred to as signals) from the optical source 18 are fed to an interferometer stage 20, here a Mach Zehnder interferometer having a first path 24 and a second path 26. The interferometer 20 includes first coupling stage 28 for coupling optical radiation between the optical source 18, the first and second paths 24, 26, and signal processing system 29. For light travelling in a forward (outbound) direction, that is, towards the outstation 14, the first coupling stage 28 acts as a directional power (intensity) splitter, channelling light from the optical source 18 to each of the paths 24, 26, the power to each path being shared in a predetermined manner.

In the present example, the first coupling stage acts as a 50:50 power splitter, the power input to each path being equal. Consequently, for each signal provided by the optical source 18 in a given time interval, that signal is copied such that there is a first copy and a second copy, the first and second copies being duplicates of one another. One copy travels along the first path 24 whilst the other copy travels along the second path 26. A second coupling stage 30 is provided for coupling light between the first and second paths 24, 26 and an output 35 of the interferometer, which output is connected to the communications link 16. For light travelling in the forward direction, the coupling stage 30 acts as a combiner, combining the light from the first and second paths and channelling this combined light to the interferometer output 35. The first path of the interferometer has a delay stage 34 for increasing the transit time of light travelling therealong between the first and second coupling stages 28, 30, such that the transit time for light travelling between the coupling stages 28, 30 is higher along the first path 24 than it is along the second path 26. For each signal produced by the optical source, the interferometer 20 serves to delay one of the signal copies relative to the other signal copy, the signal copies being transmitted onto the link 16 at different times to one another.

The additional (differential) delay imposed by the delay stage 34 is much greater than the coherence time of the optical source 18. When light travelling along the first and second paths is recombined by the second coupling stage 30, the interference between light travelling along the two paths averages out, such that on average (over a timescale much greater than the coherence time) the amplitude of light upon recombination at the second coupling stage 30 is constant (neglecting any losses in the interferometer 20 due to absorption or backscattering, for example).

For return signals travelling in the return direction, that is, for return signals arriving at the interferometer 20 from the outstation 14, the second coupling stage 30 act as a power splitter, in a similar fashion to the action of the first coupling stage 28 on light in the forward direction from the optical source 18. The first coupling stage 28 then serves to combine light from the first and second paths in the return direction, channelling the combined light to the signal processing system 29. In this way, return signals are copied at the second coupling stage 30, one copy being channelled along the first path 24, whilst the other copy is channelled along the second path 26.

The light source may be a Light Emitting Diode, a Fabry-Perot Laser Diode, or a source of amplified spontaneous emission such as an Erbium-Doped Fibre Amplifier or a Semiconductor Optical Amplifier, but preferably the light source will be a Super Luminescent Diode, since this has a broad and smooth power spectrum, and a short coherence time of about 0.5 ps or less. The radiation produced by the optical source will preferably be unpolarised, or alternatively a de-polarising unit 43 may be provided between the light source and the interferometer, for depolarising the light before the light is injected into the interferometer (the de-polarising unit may be for example, a Fibre Lyot de-polariser). A depolarisation device 49 will preferably be provided in one of the paths of the interferometer, here, the first path, so that the polarisation of light from the first path combining in the return direction at the first coupler 28 is at least partially aligned with that of the light from the other path. Typically, the source will operate at a wavelength of between 1 micron and 2 microns, preferably around 1.3 microns, in order to efficiently make use of standard telecommunications optical fibre, such fibre being configured to support single mode transmission at this wavelength. Typically, the fibre will have a single core of a diameter which is around 9 or 10 microns.

For each signal generated by the source 18, there are four duplicates of this signal: a non-retarded signal S0 which has traveled along the second path 26 of the interferometer 20 in both the forward and reverse directions; a first retarded signal S1 delayed by a delay D in the forward direction (but not the reverse direction); a second retarded signal S2 retarded by the delay D in the reverse direction (but not the forward direction); and, a twice-retarded signal S3 retarded by a delay 2D, signal S3 being retarded in each of the forward and reverse directions.

The first and second retarded signals S1, S2 which are retarded in one direction only will be returned to the first coupler stage 28 at the same time. In the absence of any disturbance in the fibre 16, these signals are copies of one another and the signals will interfere or otherwise combine constructively at the first coupler stage 28. However, if one of the pair of signals S1, S2 is modulated or otherwise modified by a disturbance along the fibre, the interference between the two signals will result in an interference signal having different spectral characteristics to the interference signal which would otherwise be produced in the absence of any disturbance to the fibre 16.

The signal processing system 29, receives from the coupling stage 28 an optical interference (combination) signal produced at the first coupling stage as a result of interference between a signals which were originally copies of one another (e.g. S1 and S2). The signal processing system 29 is configured to determine from the combination signal if the fibre 16 has been disturbed, preferably physically disturbed.

A physical disturbance (in particular a dynamic disturbance caused for example by a displacement, an acoustic or ultrasound wave or other vibration) is likely to result in a change in the transmission properties of the link. In particular, in the case of an optical fibre link, a physical disturbance is likely to result in strain which will change the optical path link of the strained portion of the fibre, either through a change in the refractive index or polarisation, or both.

A physical disturbance in the link, in particular an optical fibre link 16, is likely to result in an interference or combination signal from the first coupling stage 28, since when a disturbance occurs, the disturbance is likely to cause a phase and/or amplitude modulation in one or both of the (carrier) signals of a pair travelling along the link. However, the combination of signals will be the result of interference between, on the one hand, a carrier signal having been modulated by the disturbance at one time and on the other hand, a signal modulated by a changed disturbance at another time, the two times being separated by the differential delay D. A disturbance is likely to increase the level of background noise. In general terms, the signal processing system 29 can then detect a disturbance by monitoring the background noise and detecting an increase in the background noise beyond a threshold value, noise levels beyond this threshold value being deemed indicative of a disturbance.

A disturbance is likely to change the spectrum of background "noise" as well as the level of noise, such that different disturbances will have different characteristic spectrum types. The distance between the base station and the point where a disturbance is occurring may also affect the spectrum. In general terms, the signal processing system 29 may therefore be configured to compare the noise spectrum at intervals with stored spectrum signatures for known disturbances, and to generate a disturbance alert signal if a monitored spectrum is found to match one of the known signatures.

Alternatively, or in addition, the signal processing system 29 may be configured to run a learning algorithm in order to learn the characteristic spectrum types for different disturbances experienced along the particular optical fibre path which is being monitored.

The signal processing system includes: a photo-receiver 51 coupled to the first coupling stage 28 for converting optical signals into electrical signals; a filter 52 for receiving electrical signals from the photo-receiver 51 and filtering the electrical signals; and, a signal processing unit 54 for processing the filtered electrical signals.

The filter 52 is configured to allow signals to pass within a bandwidth of about 100 Hz to about 100 kHz, since this is the bandwidth expected for signals brought about by most physical disturbances in a fibre. The signal processing unit 54 is configured to perform a spectrum analysis of the (filtered) interference signal from the coupling stage 28, for example by performing Fourier Transform on the interference signal, to transform the time dependent interference signal into a spectrum which has the frequency components forming that time dependent signal. The measured spectrum is then compared with known spectra or signatures resulting from known disturbances in a fibre. Such known signature spectrum (or at least the characteristic frequency components of such signature spectra) will be stored in a memory location 55 of the signal processing unit 54.

To compare a measured spectrum with a known signature spectrum, the following steps may be performed by a processor 57 of the signal processing unit 54: (a) determine which, if any, frequency components are above a threshold value, and (b) determine if these frequency components coincide (within a tolerance level) with the characteristic frequency components of known signature spectra. Thus, for each measured spectrum, a respective comparison step will be performed with each of the stored signature spectrum. If only the characteristic components of a signature spectrum are stored in the memory location 55, the information stored for each signature spectrum may simply include a list of characteristic frequencies for that spectrum. The processor 57 can then compare the respective frequency values of each component of a measured spectrum with the frequency values of a signature spectrum. A score value indicative of the degree of correlation between a measured spectrum and a signature may then be generated, and an alarm may be triggered if the score value exceeds a threshold.

To determine the degree of correlation, the following steps may be performed; (a) for a frequency component of a measured spectrum, determine whether a signature spectrum has a frequency component within a tolerance level of the measured frequency component, incrementing a score value counter if a match is found; (b) for each frequency component in the measured spectrum above a threshold, repeat step (a) with respect to that signature spectrum, incrementing the score value counter each time a match is found; and, (c), associating a score value with the final value of the score value counter, for each measured spectrum in respect of at least one signature spectrum.

The memory location 55 may also store an amplitude value associated with each frequency component of a signature spectrum. The processor 57 may then perform a more sophisticated algorithm, in which when determining the degree of correlation between a frequency spectrum and a measured spectrum, the similarity of the frequency values as well as the amplitude of the corresponding components is taken into account when incrementing the score value counter. The memory location 55 will preferably be configured to store interference signals received within a time interval, the comparison between a measured spectrum and signature spectra being performed in respect of each captured or measured spectrum in each time interval.

In one embodiment, the processing unit 54 will be an audio amplifier, for amplifying the filtered audio signals resulting from the combination or interference of the returned signals interfering at the coupling stage 28. The audio signal will normally be representative of the disturbance, and the sensing portion of the fibre can be viewed as acting as a microphone. The audio amplifier will preferably have a loudspeaker means for producing an audible sound which an operator can hear, so that the operator will be able to infer from the type and volume of the sound (e.g., whether it is above a background level, such as noise) whether a disturbance has occurred, and what the level of this disturbance is.

The first coupling stage 28, at the source side of the interferometer, will preferably be a 3×3 coupler (with some ports terminated), whereas the second coupling stage 30, at the transmission side, will preferably be a 2×2 coupler, with one port terminated. The 3×3 coupler is used in order to create a relative phase bias of $\phi_b=120°$ between the optical fields on its output ports. This can be used to improve the sensitivity of the interferometer when detecting disturbances due to cable handling, street works or unauthorised interference. (We denote the phase modulation due to a disturbance as $\phi_d(t)$.). It can be shown that the receiver ac output signal is proportional to: $r_{ac}(t)=k. \cos\{\phi_b+\phi_d(t)+\phi_m(t)\}$ where, k is a constant of proportionality and $\phi_m(t)$ could be the data phase modulation signal. The equation shows how the phase bias can be used to select a higher slope region of the Cosine function in order to improve the sensitivity when the magnitude of the disturbance is small.

Although in FIG. 2 a fibre or cable is shown extending between a monitoring station and an outstation (so that the fibre can act as a communication link for carrying data between the two stations), it will be appreciated that the fibre need not be used to carry data, and can simply be used as a sensor, the fibre having a free end so that it can be permanently or temporarily placed in a position where sensing is to be carried out.

As can be seen from the above description, the present embodiment provides a simple and sensitive way of monitoring a fibre to detect a disturbance, if any, in the fibre, by relying on backscattering, such as Rayleigh backscattering, to return test signals transmitted along the fibre. The embodiment can be useful as a general surveillance technique, for example if the fibre being monitored is placed so as to be mechanically coupled to an object or surface being monitored.

What is claimed is:

1. A method of monitoring an optical waveguide to detect a dynamic physical disturbance of the optical waveguide, the method comprising:
   transmitting pairs of signal copies of a signal output from an optical source onto an optical waveguide including a sensing portion along which a transmitted signal senses a disturbance along the sensing portion, and a return portion, for returning said transmitted signal by a process of distributed backscattering towards the sensing portion;
   receiving returned backscattered signals generated by the signal copies previously transmitted onto the optical waveguide;
   for returned backscattered signal components of the signal copies, combining a backscattered component of one signal copy of a pair with the other signal copy of that pair, such that, from the combination of the two backscattered component signal copies of a pair, a combination signal is generated; and
   generating a disturbance alert signal from the combination signal,
   wherein the backscattered component signal copies are returned from said return portion by a process of distributed backscattering along the optical waveguide.

2. A method as claimed in claim 1, wherein the optical waveguide has a transmission medium with inhomogeneities distributed therealong, and wherein the backscattering is Rayleigh backscattering off the inhomogeneities.

3. A method as claimed in claim 1, including generating the transmitted signals.

4. A method as claimed in claim 1, wherein the transmitted signals have an irregular component that is random or pseudo random.

5. A method as claimed in claim 1, wherein:
   the output signals have an irregular component that is random or pseudo random, and
   the output signal has a waveform, the irregular component being the phase of the waveform, the waveform having randomly occurring phase changes.

6. A method as claimed in claim 1, wherein:
   the output signals have an irregular component that is random or pseudo random,
   the output signal has a waveform, the irregular component being the phase of the waveform, the waveform having randomly occurring phase changes, and
   the transmitted signal copies are carried along an optical waveguide which forms a common transmission medium in a common communications link.

7. A method as claimed in claim 1, wherein transmitted signal copies of a pair are delayed relative to one another at a first location, and wherein a disturbance detected in the sensing portion occurs remotely from the first location.

8. A method as claimed in claim 1, wherein:
   the transmitted signal copies of a pair are delayed relative to one another at a first location,
   a disturbance detected in the sensing portion occurs remotely from the first location, and
   the differential delay is caused at an unbalanced interferometer, the interferometer having a first path and a second path, the transit time of the first path being longer than that of the second path, and the signal copies of a pair are caused to travel along a different respective path to one another.

9. A method as claimed in claim 1, wherein:
   signal copies of a pair are delayed relative to one another at a first location,
   a disturbance detected in the sensing portion occurs remotely from the first location,
   the differential delay is caused at an unbalanced interferometer, the interferometer having a first path and a second path, the transit time of the first path being longer than that of the second path, signal copies of a pair being caused to travel along a different respective path to one another, and
   the interferometer has a first coupling stage which is coupled to the source, the coupling stage being arranged to channel one portion of the incoming radiation intensity from the source along one path, and another portion of the incoming radiation intensity along the other path, so as to form first and second transmitted signal copies.

10. A method as claimed in claim 1, wherein:
the transmitted signal copies are carried along an optical waveguide which forms a common transmission medium in a common communications link,
signal copies of a pair are delayed relative to one another at a first location,
a disturbance detected in the sensing portion occurs remotely from the first location,
the differential delay is caused at an unbalanced interferometer, the interferometer having a first path and a second path, the transmit time of the first path being longer than that of the second path, signal copies of a pair being caused to travel along a differential respective path to one another,
the interferometer has a first coupling stage which is coupled to the optical source, the coupling stage being arranged to channel one portion of the incoming radiation intensity from the source along one path, and another portion of the incoming radiation intensity along the other path, so as to form the first and second signal copies, and
the interferometer has a second coupling stage for combining radiation from the first and second paths, and for coupling the combined radiation to the common communications link.

11. A method as claimed in claim 1, wherein:
the transmitted signal copies are carried along an optical waveguide which forms a common transmission medium in a common communications link
signal copies of a pair of delayed relative to one other at a first location,
a disturbance detected in the sensing portion occurs at a second location remotely from the first location,
the differential delay is cased at an unbalanced interferometer, the interferometer having a first path and a second path, the transmit time of the first path being longer than that of the second path, signal copies of a pair being caused to travel along a different respective path to one another,
the interferometer has a first coupling stage which is coupled to the source, the coupling stage being arranged to channel one portion of the incoming radiation intensity from the source along one path, and another portion of the incoming radiation intensity along the other path, so as to form first and second signal copies,
the interferometer has a second coupling stage for combining radiation from the first and second paths, and for coupling the combined radiation to the common communications link and
the backscattered signals returned from the second location are each channeled along the first and second paths by a second coupling stage, and wherein the so channeled signals are subsequently combined at the first coupling stage.

12. A method as claimed in claim 11, wherein:
the source is configured to produce a continuous signal stream, and
the signal stream has a wavelength of between 1 micron and 2 microns.

13. A method as claimed in claim 1, wherein the source is configured to produce a continuous signal stream.

14. A method as claimed in claim 1, wherein the signal copies are delayed relative to one another at the first location.

15. A method as claimed in claim 1, wherein the signals are portions of a waveform, which portions are preferably joined seamlessly to form a continuous waveform.

16. A method as claimed in claim 1, wherein the signals that are returned from a remote region to the first location are returned along the common communications link.

17. A method as claimed in claim 1, wherein the waveform has an average phase-coherence time of less than 1 pico seconds.

18. A method as claimed in claim 1, wherein the optical waveguide has a transmission medium with inhomogeneities distributed therealong, the inhomogeneities causing distributed backscattering.

19. A method as claimed in claim 18, wherein the optical waveguide is an optical fibre.

20. A method as claimed in claim 19, wherein the optical waveguide is a glass optical fibre.

21. A method as claimed in claim 19, wherein the optical waveguide is an optical fibre formed from a plastics material.

22. A method as claimed in claim 1, wherein the waveguide acts as a communications transmission link.

23. A method as claimed in claim 1, wherein the disturbance alert signal is generated by a signal processing system detecting a disturbance by monitoring the background noise and detecting an increase in the background noise beyond a threshold value, noise levels beyond this threshold value being indicative of a disturbance.

24. A method of using distributed backscattering in a waveguide to detect or infer the presence of a disturbance in the waveguide, wherein the disturbance is a dynamic disturbance, comprising:
(a) transmitting outbound test signals along the fibre, which test signals are formed as pairs of signal copies of a signal from an optical source;
(b) receiving inbound test signals, which inbound test signals are formed by a backscattered component of the outbound test signals arising from distributed backscattering of the outbound test signals along a remote portion of the fibre; and
(c) combining the respective copies of each pair of received inbound test signals in order to detect or infer the presence of a disturbance, the disturbance being located such that at least some of the received inbound signals are affected by the disturbance.

25. A method as claimed in claim 24, wherein the waveguide is an optical fibre.

26. A method as claimed in claim 24, wherein the waveguide acts as a communications transmission link.

27. A method as claimed in claim 24, further comprising a signal processing system detecting the disturbance by:
monitoring the background noise; and
detecting an increase in the background noise beyond a threshold value, wherein noise levels beyond this threshold value are indicative of the disturbance.

28. An optical waveguide sensor arranged to detect a dynamic physical disturbance, the sensor including:
an optical waveguide comprising:
a sensing portion along which a transmitted signal senses a disturbance along the sensing portion, and
a return portion, for returning a said transmitted signal by a process of distributed backscattering towards the sensing portion,
and
at the near end of the optical waveguide:
a signal transmitter for transmitting pairs of signal copies of a signal from an optical source onto the optical waveguide;

an optical receiver for receiving returned backscattered components of signal copies previously transmitted onto the optical waveguide; and a signal processing system for processing returned backscattered components of signal copies by combining a backscattered component signal of one signal copy of a pair with a backscattered component signal of the other signal copy of that pair, such that, from the combination of the two backscattered component signals of the signal copies of a pair, a combination signal is generated; and, from the combination signal, a disturbance alert signal is generated, wherein the signal copies are returned from said return portion by a process of distributed backscattering along the optical waveguide.

29. A system as claimed in claim 28, wherein the disturbance alert signal is generated by the signal processing system detecting a disturbance by monitoring the background noise and detecting an increase in the background noise beyond a threshold value, noise levels beyond this threshold value being indicative of a disturbance.

* * * * *